(12) United States Patent
Hwang et al.

(10) Patent No.: US 11,331,950 B2
(45) Date of Patent: May 17, 2022

(54) NON-PNEUMATIC TIRE

(71) Applicant: KUMHO TIRE CO., INC., Gwangju (KR)

(72) Inventors: Soon Wook Hwang, Gwangju (KR); Kee Woon Kim, Gwangju (KR); Chui Woo Kwark, Gwangju (KR); Chang Jung Park, Gwangju (KR)

(73) Assignee: Kumho Tire Co., Inc., Gwangju (KR)

( * ) Notice: Subject to any disclaimer, the term of this patent is extended or adjusted under 35 U.S.C. 154(b) by 205 days.

(21) Appl. No.: 16/690,014

(22) Filed: Nov. 20, 2019

(65) Prior Publication Data

US 2021/0039439 A1 Feb. 11, 2021

(30) Foreign Application Priority Data

Aug. 7, 2019 (KR) .................. 10-2019-0096128

(51) Int. Cl.
*B60C 7/14* (2006.01)
*B60B 9/26* (2006.01)
*B60C 7/10* (2006.01)

(52) U.S. Cl.
CPC ............. *B60C 7/14* (2013.01); *B60B 9/26* (2013.01); *B60C 7/107* (2021.08); *B60C 7/146* (2021.08)

(58) Field of Classification Search
CPC ....... B60C 7/14; B60C 7/18; B60C 2007/107; B60C 2007/146; B60B 9/10; B60B 9/26
See application file for complete search history.

(56) References Cited

U.S. PATENT DOCUMENTS

| | | | | |
|---|---|---|---|---|
| 4,169,494 A | * | 10/1979 | Kubica | B60C 7/12 152/310 |
| 5,042,544 A | * | 8/1991 | Dehasse | B60C 7/12 152/302 |
| 8,714,217 B2 | * | 5/2014 | Chon | B60B 9/02 152/74 |
| 8,757,228 B2 | * | 6/2014 | Dutton | B60B 9/04 152/10 |
| 2009/0173421 A1 | * | 7/2009 | Love | B60C 7/10 152/246 |
| 2011/0168313 A1 | | 7/2011 | Ma et al. | |
| 2013/0240272 A1 | | 9/2013 | Gass et al. | |
| 2017/0157983 A1 | * | 6/2017 | Siegel | B60B 9/12 |
| 2017/0239994 A1 | * | 8/2017 | Raulerson, Jr. | B60C 7/08 |

(Continued)

FOREIGN PATENT DOCUMENTS

| | | |
|---|---|---|
| CN | 201619392 U | 11/2010 |
| CN | 109941035 A | 6/2019 |
| DE | 10 2017 115 456 A | 2/2018 |

(Continued)

*Primary Examiner* — Jason R Bellinger
*Assistant Examiner* — Emily G. Castonguay
(74) *Attorney, Agent, or Firm* — Knobbe Martens Olson & Bear LLP

(57) ABSTRACT

A non-pneumatic tire comprises: a band part including an inner band and an outer band, the outer band being separated from the inner band by a predetermined distance to surround the inner band; and a spoke part provided to extend in a circumferential direction of the tire between the inner band and the outer band, the spoke part including one or more holes when viewed in the circumferential direction and one or more holes when viewed in an axial direction of the tire.

8 Claims, 5 Drawing Sheets

(56) References Cited

U.S. PATENT DOCUMENTS

2019/0143619 A1* 5/2019 Shin .................. B60C 7/20
156/245

FOREIGN PATENT DOCUMENTS

| JP | 2010-522666 A | 7/2010 |
| JP | 2012-62045 A | 3/2012 |
| JP | 2014-169066 A | 9/2014 |
| JP | 2019-98920 A | 6/2019 |
| KR | 10-2011-0018527 A | 2/2011 |
| KR | 10-2017-0033779 A | 3/2017 |
| WO | 2019/074834 A1 | 4/2019 |

* cited by examiner

NON-PNEUMATIC TIRE

CROSS-REFERENCE TO RELATED APPLICATION

This application is based on and claims priority from Korean Patent Application No. 10-2019-0096128, filed on Aug. 7, 2019, the disclosure of which is incorporated herein in its entirety by reference for all purposes.

FIELD

The present disclosure relates to a non-pneumatic tire.

BACKGROUND

Tires are mounted on wheels of various motor vehicles ranging from small motor vehicles to heavy motor vehicles and are configured to perform a function of supporting the load of a motor vehicle, a function of transmitting the power of a motor vehicle to the ground, and a function of absorbing vibrations or shocks generated from the ground when a motor vehicle travels.

In the case of a typical pneumatic tire, air is filled in the inside of the tire, thereby providing an excellent shock-absorbing effect against impact and bending. However, when the tire is damaged due to a puncture or impact from an external object, the internal air pressure is not maintained, which makes it difficult to perform the functions of a tire. In addition, when the tire is damaged during traveling, the handling and braking ability of a motor vehicle may be diminished, causing safety issues.

The disclosure of this section is to provide background information relating to the invention. Applicant does not admit that any information in this section constitute prior art.

SUMMARY

In view of the above, the present disclosure provides a non-pneumatic tire having excellent driving performance and load bearing ability.

In addition, the present disclosure provides a non-pneumatic tire capable of reducing vibration and noise.

In accordance with an aspect of the present disclosure, there is provided a non-pneumatic tire comprising: a band part including an inner band and an outer band, the outer band being separated from the inner band by a predetermined distance to surround the inner band; and a spoke part provided to extend in a circumferential direction of the tire between the inner band and the outer band, the spoke part including one or more holes when viewed in the circumferential direction and one or more holes when viewed in an axial direction of the tire.

With such configurations, the non-pneumatic tire has excellent driving performance and load bearing ability.

In addition, the non-pneumatic tire is capable of reducing vibration and noise.

Further, the non-pneumatic tire can have excellent rigidity.

BRIEF DESCRIPTION OF THE DRAWINGS

The objects and features of the present disclosure will become apparent from the following description of embodiments, given in conjunction with the accompanying drawings, in which.

DETAILED DESCRIPTION OF THE EMBODIMENTS

Figure 1:
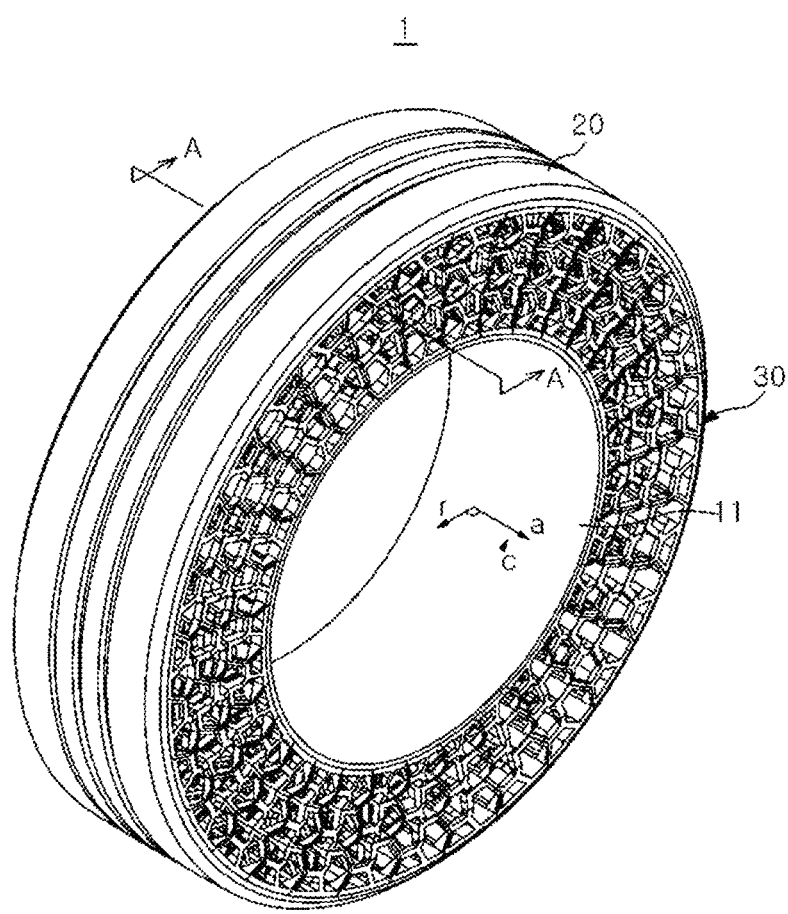
FIG. 1 is a schematic perspective view of a non-pneumatic tire according to an embodiment of the present disclosure.

Hereinafter, configurations and operations of embodiments will be described in detail with reference to the accompanying drawings.

In describing the embodiments of the present disclosure, the detailed descriptions of well-known functions or configurations will be omitted if it is determined that the detailed descriptions of well-known functions or configurations may unnecessarily make obscure the spirit of the present disclosure.

The disclosure may be variously modified and may include various embodiments. Specific embodiments will be exemplarily illustrated in the drawings and described in the detailed description of the embodiments. However, it should be understood that they are not intended to limit the disclosure to specific embodiments but rather to cover all modifications, similarities, and alternatives which are included in the spirit and scope of the disclosure.

The terms used herein, including ordinal numbers such as "first" and "second" may be used to describe, and not to limit, various components. The terms simply distinguish the components from one another.

When it is said that a component is "coupled" or "connected" to another component, it should be understood that the former component may be directly coupled or connected to the latter component or a third component may be interposed between the two components.

In the present disclosure, the meaning of "comprising", "including", "having" and the like, used for a specific property, region, integer, step, operation, element and/or component, does not exclude another specific property, region, integer, step, operation, element, component and/or group.

Specific terms used in the present application are used simply to describe specific embodiments without limiting the disclosure. An expression used in the singular encompasses the expression of the plural, unless it has a clearly different meaning in the context.

A non-pneumatic tire that does not require filling of air has been developed. In the case of the non-pneumatic, spokes are provided between a tread and a wheel to perform the same functions as the internal air pressure of a pneumatic tire. The shock-absorbing effect, the traveling ability, the ride quality and the like of the non-pneumatic tire are determined by the material, structure and shape of the spokes.

However, the typical non-pneumatic tires have been developed only for low-speed or special-purpose vehicles, and cause noise and vibration. Therefore, the non-pneumatic tire cannot be applied to general vehicles that travel at a high speed.

Accordingly, research on a non-pneumatic tire including a spoke structure, which has an excellent effect on characteristics for load support, durability, and noise and vibration and is applicable in various vehicle environments, is demanded, and various non-pneumatic tire structures and spokes are being developed to meet such a demand.

However, the spokes of the non-pneumatic tires have the same shape in the circumferential direction and are continuous in the lateral direction. The spokes of the above structure has a non-uniform rigidity, which causes noise and vibration.

Meanwhile, a radial direction described below means a radial direction of a tire (indicated by "r" in FIG. 1), an axial direction means a direction perpendicular to the radial direction and parallel to a rotation axis of the tire (indicated by "a" in FIG. 1). The axial direction does not necessarily pass through the rotation center of the tire, and may include a direction parallel to the rotation axis of the tire. Further, a circumferential direction means a direction extending along the circumference surface of the tire and perpendicular to the radial direction (indicated by "c" in FIG. 1). The circumference direction may be clockwise or counterclockwise when seen from a side of the tire.

The above-described directions include positive directions and negative directions. Further, one axial direction may be the right direction in FIG. 3, and the other axial direction may be the left direction in FIG. 3; one radial direction may be a direction directed toward the center of the tire from the circumference of the tire in FIG. 5, and the other radial direction may be a direction directed toward the circumference of the tire from the center of the tire in FIG. 5; and one circumferential direction may be clockwise in FIG. 5, and the other circumferential direction may be counterclockwise in FIG. 5.

In the present specification, although the axial direction, the radial direction, and the circumferential direction have been exemplarily described as above, the one direction and the other direction may be interchanged, but the present disclosure is not limited thereto.

Hereinafter, an embodiment of the present disclosure will be described in detail with reference to the accompanying drawings.

Referring to FIG. 1, a non-pneumatic tire 1 according to an embodiment of the present disclosure supports a vehicle's own weight and a load on the vehicle, transmits driving force and braking force to a road surface while driving, and absorbs or alleviates an impact transferred from the road surface. The non-pneumatic tire 1 is connected to a rim (not shown). In addition, the non-pneumatic tire 1 includes a band part 10, a tread 20, and a spoke part 30.

Figure 2:
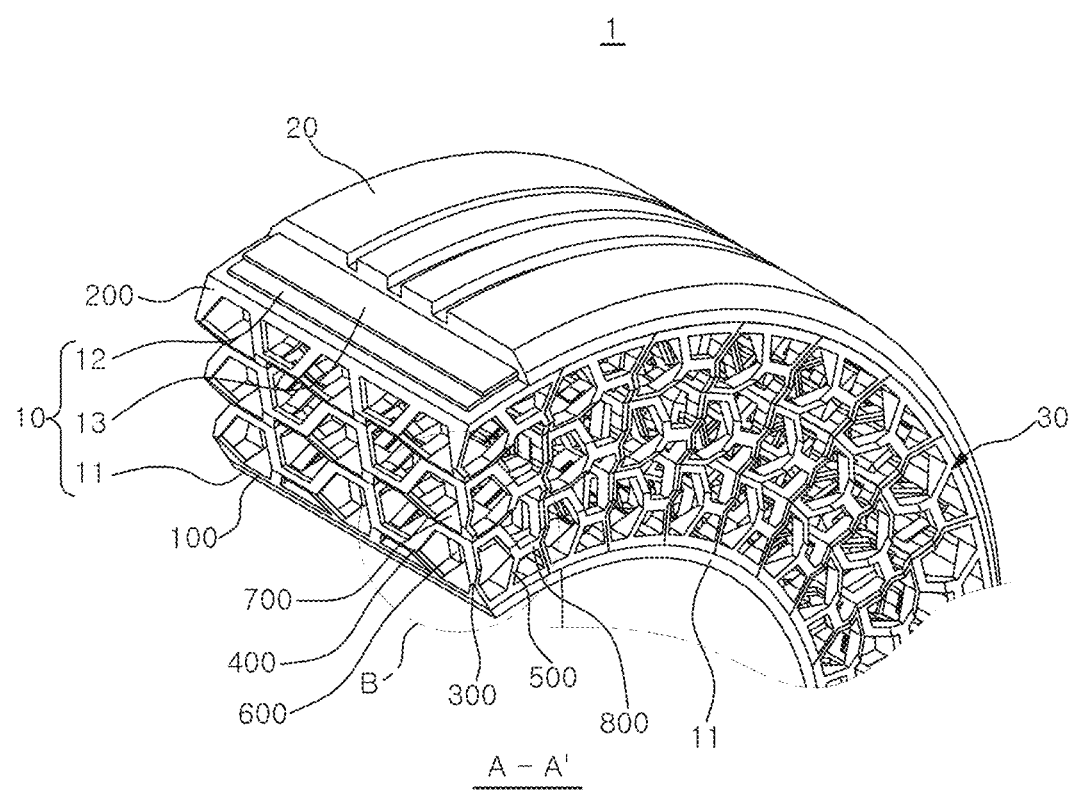
FIG. 2 is a sectional perspective view taken along a line A-A' of FIG. 1.

Referring to FIG. 2, the band part 10 has a shape corresponding to an overall outer shape of the non-pneumatic tire 1. The band part 10 may be formed as one unit with the spoke part 30. The band part 10 includes an inner band 11, an outer band 12 and a shear band 13.

The inner band 11 is coupled to an outer peripheral surface of the rim. Therefore, the shape of the inner band 11 may be variously deformed depending on the shape of the rim.

The outer band 12 is separated from the inner band 11 by a predetermined distance to surround the inner band 11. In other words, the inner peripheral surface of the outer band 12 and the outer peripheral surface of the inner band 11 face each other. The outer band 12 and the inner band 11 are connected to each other by the spoke part 30 to be described later. The inner peripheral surface of the outer band 12 is provided to surround an outer peripheral surface of a second spoke body 200 to be described later.

The shear band 13 is provided at an outer peripheral surface of the outer band 12. The shear band 13 is provided in a shape corresponding to the shape of the outer band 12 along a circumferential direction of the outer band 12.

The shear band 13 serves to primarily reduce an initial stress applied to the non-pneumatic tire 1. The shear band 13 may be formed in one or more layers of a composite material containing carbon fiber or a composite material containing steel cord. For example, the shear band 13 may be made of CFRP (Carbon Fiber Reinforced Plastics) or formed in one or more layers of steel-cord belt, nylon-cord belt and aramid-cord belt used for a pneumatic tire.

The tread 20 is provided at an outer peripheral surface of the shear band 13. The tread 20 is provided at an outermost side of the non-pneumatic tire 1 to be in direct contact with a ground. Various structures used in this field may be employed for the tread 20.

The spoke part 30 is provided between the inner band 11 and the outer band 12. The spoke part 30 serves as a support for connecting the inner band 11 and the outer band 12. In addition, the spoke part 30 serves as a shock absorber by dispersing and absorbing the shock applied to the non-pneumatic tire 1, and serves to support the load of a vehicle to which the non-pneumatic tire 1 is mounted.

The spoke part 30 is made of a thermoplastic elastomer (TPE). For example, the spoke part 30 may be made of at least one of thermoplastic polyester elastomer (TPEE), thermoplastic polyurethane elastomer (TPU), thermoplastic olefinic elastomer (TPO), thermoplastic and polyamide elastomer (TPAE).

The tensile modulus of the spoke part 30 may be measured by ASTM D638. The tensile modulus of the spoke part 30 may be within a range from 30 MPa to 200 MPa. When the tensile modulus of the spoke part 30 is less than 30 MPa, the load supporting capability becomes weak. Accordingly, the spoke part 30 may be excessively deformed even by small impact and the deformation of the spoke part 30 may result in breakage of the spoke part 30. When the tensile modulus of the spoke part 30 exceeds 200 MPa, hardness is excessively increased. Accordingly, the bending/stretching of the spoke part 30 becomes poor and ride quality deteriorates.

Further, the flexural modulus of the spoke part 30 may be measured by ASTM D790. The flexural modulus of the spoke part 30 may be within a range from 40 MPa to 300 MPa. When the flexural modulus of the spoke part 30 is less than 40 MPa, the load supporting capability becomes weak. Accordingly, the spoke part 30 may be excessively deformed even by small impact and the deformation of the spoke part 30 may result in breakage of the spoke part 30. When the flexural modulus of the spoke part 30 exceeds 300 MPa, the bending of the spoke part 30 becomes poor and the ride quality deteriorates.

The spoke part 30 extends in a circumferential direction between the inner band 11 and the outer band 12. In other words, the spoke part 30 is configured to form a closed curve along the circumference of the tire. When viewed in the axial direction, the spoke part 30 includes one or more holes 900 (910 and 920). Further, when viewed in the circumferential direction, the cross section of the spoke part 30 includes one or more holes 900 (910 and 920).

The spoke part 30 includes a first spoke body 100, a second spoke body 200, a first spoke 300, a second spoke 400, a third spoke 500, a fourth spoke 600, a first connection member 700, a second connection member 800, and holes 900.

The first spoke body 100 is provided to surround all or part of the outer peripheral surface of the inner band 11 and connected to the outer peripheral surface of the inner band 11. The first spoke body 100 has a predetermined thickness in the radial direction, and extends in the axial direction and the circumferential direction. In addition, a plurality of first spoke bodies 100 may be provided, and the plurality of first spoke bodies 100 may be spaced apart along the circumferential direction. The first spoke bodies 100 spaced apart along the circumferential direction may surround portions of the outer peripheral surface of the inner band 11, respectively.

The second spoke body 200 is connected to the inner peripheral surface of the outer band 12. The outer peripheral surface of the second spoke body 200 contacts with the inner peripheral surface of the outer band 12 to support the outer band 12. The inner peripheral surface of the second spoke body 200 faces the outer peripheral surface of the inner band 11. The second spoke body 200 has a predetermined thickness in the radial direction, and extends in the axial direction and the circumferential direction. In addition, the second spoke body 200 is connected with the first spoke body 100 through the first spoke 300, the second spoke 400, the third spoke 500 and the fourth spoke 600 to be described later.

Referring to FIG. 2, the first spoke 300 supports a load applied to the spoke part 30. The first spoke 300 extends between the first spoke body 100 and the second spoke body 200 to connect the first spoke body 100 and the second spoke body 200.

For example, the first spoke 300 may extend in a zigzag shape between the first spoke body 100 and the second spoke body 200. In addition, a plurality of first spokes 300 may be provided, and the plurality of first spokes 300 may be spaced apart along the axial direction and the circumferential direction. In addition, the first spoke 300 may include a plurality of first spoke pieces disposed along the radial direction between the first spoke body 100 and the second spoke body 200 and the plurality of first spoke pieces may be connected through the first connection member 700 to be described later.

One end in the radial direction of the first spoke 300 is connected to the first spoke body 100 or the first connection member 700. In addition, the other end in the radial direction of the first spoke 300 is connected to the second spoke body 200 or the first connection member 700. The first spoke 300 includes a first support 310, a second support 320, and a first joint 330. The first support 310 and the second support 320 are connected through the first joint 330 at a predetermined angle.

Figure 3:
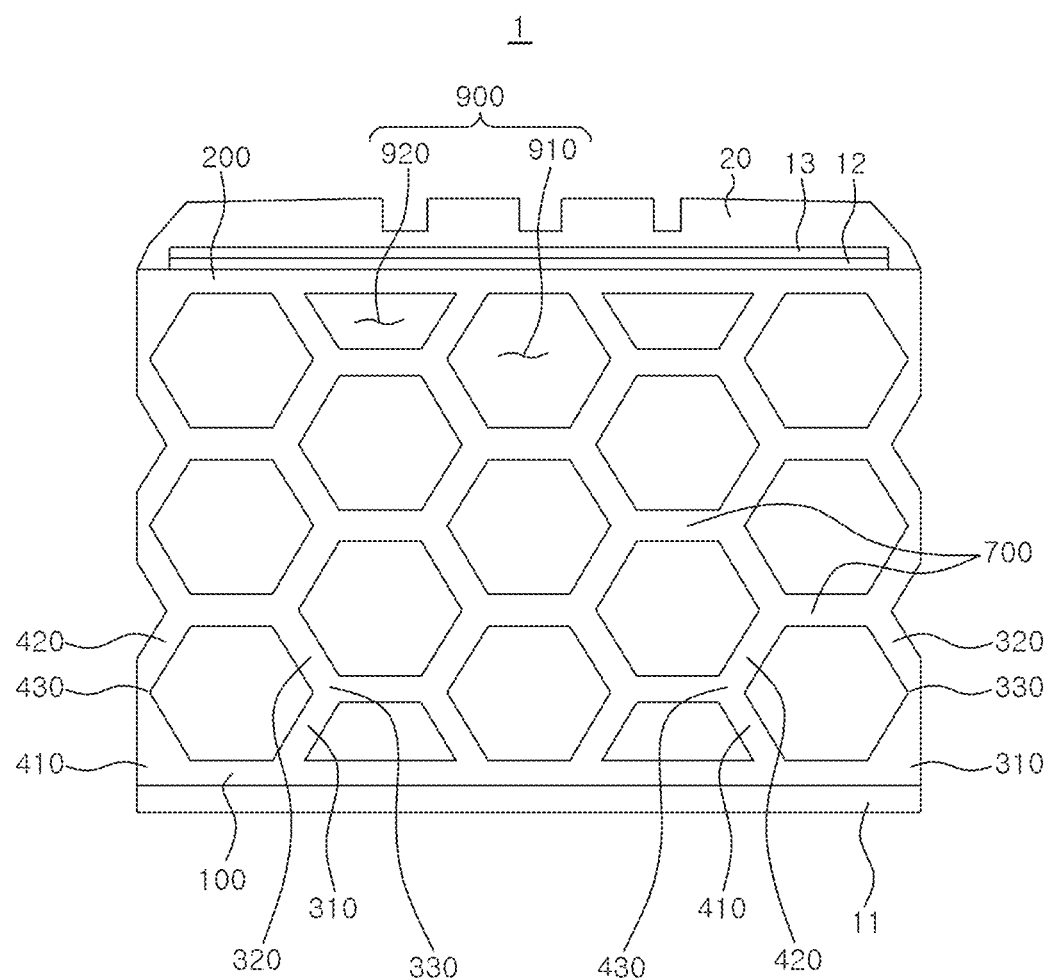
FIG. 3 is a cross-sectional view taken along the line A-A' of FIG. 1.

Referring to FIG. 3, the first support 310 supports a load applied to the first spoke 300. One end in the radial direction of the first support 310 is connected to the first spoke body 100 or the first connection member 700, and the other end in the radial direction of the first support 310 is connected to the second support 320. The first support 310 inclines toward one side in the axial direction when viewed in the circumferential direction, and inclines toward the other side of the circumferential direction when viewed in the axial direction.

The second support 320 supports a load applied to the first spoke 300. One end in the radial direction of the second support 320 is connected to the first support 310, and the other end in the radial direction of the second support 320 is connected to the second spoke body 200 or the first connection member 700. The second support 320 inclines toward the other side in the axial direction when viewed in the circumferential direction, and inclines toward one side of the circumferential direction when viewed in the axial direction.

The first joint 330 connects the first support 310 and the second support 320. In other words, the first joint 330 connects the other end in the radial direction of the first support 310 to one end in the radial direction of the second support 320. In addition, the first joint 330 provides a portion through which the second connection member 800 to be described later is connected to the first spoke 300.

The second spoke 400 supports a load applied to the spoke part 30. The second spoke 400 extends between the first spoke body 100 and the second spoke body 200 to connect the first spoke body 100 and the second spoke body 200.

For example, the second spoke 400 may extend in a zigzag shape between the first spoke body 100 and the second spoke body 200. In addition, a plurality of second spokes 400 may be provided, and the plurality of second spokes 400 may be spaced apart along the axial direction and the circumferential direction. In addition, the second spoke 400 may include a plurality of second spoke pieces disposed along the radial direction between the first spoke body 100 and the second spoke body 200 and the plurality of second spoke pieces may be connected through the first connection member 700 to be described later.

One end in the radial direction of the second spoke 400 is connected to the first spoke body 100 or the first connection member 700. In addition, the other end in the radial direction of the second spoke 400 is connected to the second spoke body 200 or the first connection member 700. The second spoke 400 includes a third support 410, a fourth support 420, and a second joint 430. The third support 410 and the fourth support 420 are connected through the second joint 430 at a predetermined angle.

Referring to FIG. 3, the third support 410 supports a load applied to the second spoke 400. One end in the radial direction of the third support 410 is connected to the first spoke body 100 or the first connection member 700, and the other end in the radial direction of the third support 410 is connected to the fourth support 420. The third support 410 inclines toward the other side in the axial direction when viewed in the circumferential direction, and inclines toward the other side of the circumferential direction when viewed in the axial direction.

The fourth support 420 supports a load applied to the second spoke 400. One end in the radial direction of the fourth support 420 is connected to the third support 410, and the other end in the radial direction of the fourth support 420 is connected to the second spoke body 200 or the first connection member 700. The fourth support 420 inclines toward the other side in the axial direction when viewed in the circumferential direction, and inclines toward one side of the circumferential direction when viewed in the axial direction.

The second joint 430 connects the third support 410 and the fourth support 420. In other words, the second joint 430 connects the other end in the radial direction of the third support 410 to one end in the radial direction of the fourth support 420. In addition, the second joint 430 provides a portion through which the second connection member 800 to be described later is connected to the second spoke 400.

Figure 4:
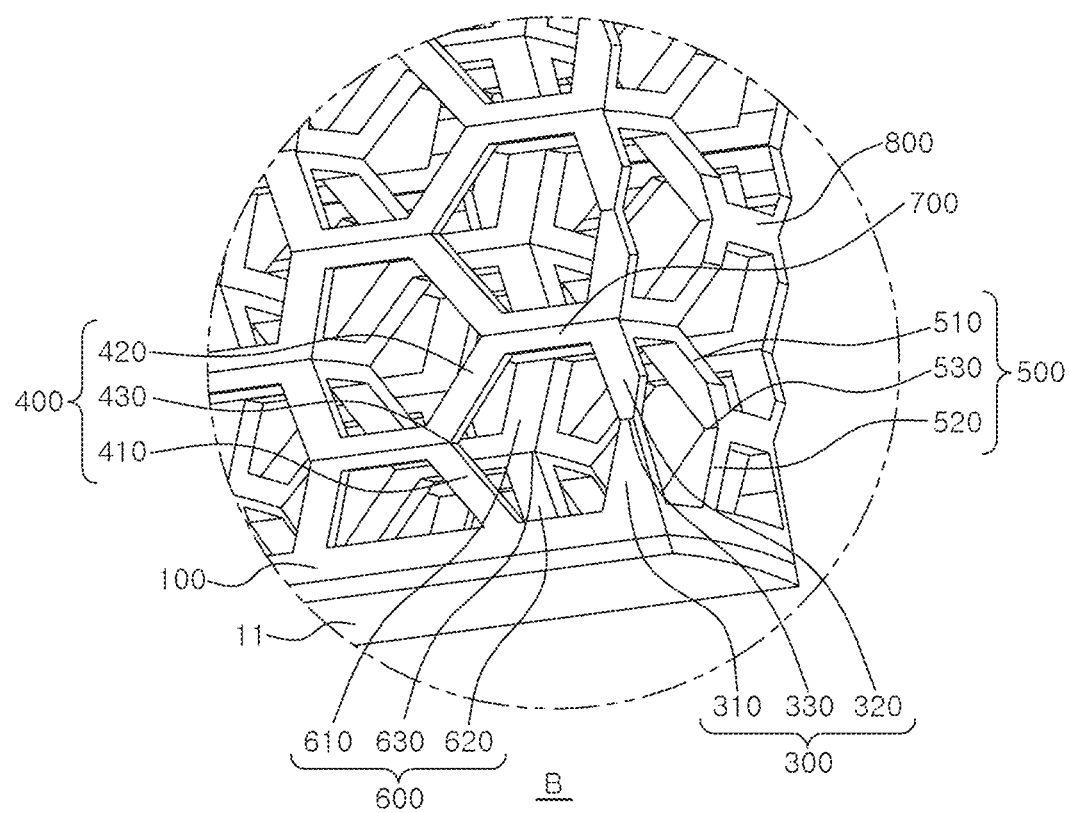
FIG. 4 is an enlarged view of a portion B of FIG. 2.

Referring to FIG. 4, the third spoke 500 supports a load applied to the spoke part 30. The third spoke 500 extends between the first spoke body 100 and the second spoke body 200 to connect the first spoke body 100 and the second spoke body 200.

For example, the third spoke 500 may extend in a zigzag shape between the first spoke body 100 and the second spoke body 200. In addition, a plurality of third spokes 500 may be provided, and the plurality of third spokes 500 may be spaced apart along the axial direction and the circumferential direction. In addition, the third spoke 500 may include a plurality of third spoke pieces disposed along the radial direction between the first spoke body 100 and the second spoke body 200 and the plurality of third spoke pieces may be connected through the first connection member 700 to be described later.

One end in the radial direction of the third spoke 500 is connected to the first spoke body 100 or the first connection member 700. In addition, the other end in the radial direction of the third spoke 500 is connected to the second spoke body 200 or the first connection member 700. The third spoke 500 includes a third support 510, a fourth support 520, and a third joint 530. The third support 510 and the fourth support 520 are connected through the third joint 530 at a predetermined angle.

Referring to FIG. 4, the third support 510 supports a load applied to the third spoke 500. One end in the radial direction of the third support 510 is connected to the fourth support 520, and the other end in the radial direction of the third support 510 is connected to the second spoke body 200 or the first connection member 700. The third support 510 inclines toward the other side in the axial direction when viewed in the circumferential direction, and inclines toward the other side of the circumferential direction when viewed in the axial direction.

The fourth support 520 supports a load applied to the third spoke 500. One end in the radial direction of the fourth support 520 is connected to the first spoke body 100 or the first connection member 700, and the other end in the radial direction of the fourth support 520 is connected to the third support 510. The fourth support 520 inclines toward one side in the axial direction when viewed in the circumferential direction, and inclines toward one side of the circumferential direction when viewed in the axial direction.

The third joint 530 connects the third support 510 and the fourth support 520. In other words, the third joint 530 connects one end in the radial direction of the third support 510 to the other end in the radial direction of the fourth support 520. In addition, the third joint 530 provides a portion through which the second connection member 800 to be described later is connected to the third spoke 500.

The fourth spoke 600 supports a load applied to the spoke part 30. The fourth spoke 600 extends between the first spoke body 100 and the second spoke body 200 to connect the first spoke body 100 and the second spoke body 200.

For example, the fourth spoke 600 may extend in a zigzag shape between the first spoke body 100 and the second spoke body 200. In addition, a plurality of fourth spokes 600 may be provided, and the plurality of fourth spokes 600 may be spaced apart along the axial direction and the circumferential direction. In addition, the fourth spoke 600 may include a plurality of fourth spoke pieces disposed along the radial direction between the first spoke body 100 and the second spoke body 200 and the plurality of fourth spoke pieces may be connected through the first connection member 700 to be described later.

One end in the radial direction of the fourth spoke 600 is connected to the first spoke body 100 or the first connection member 700. In addition, the other end in the radial direction of the fourth spoke 600 is connected to the second spoke body 200 or the first connection member 700. The fourth spoke 600 includes a first support 610, a second support 620, and a first joint 630. The first support 610 and the second support 620 are connected through the first joint 630 at a predetermined angle.

The first support 610 supports a load applied to the fourth spoke 600. One end in the radial direction of the first support 610 is connected to the second support 620, and the other end in the radial direction of the first support 610 is connected to the second spoke body 200 or the first connection member 700. The first support 610 inclines toward one side in the axial direction when viewed in the circumferential direction, and inclines toward the other side of the circumferential direction when viewed in the axial direction.

The second support 620 supports a load applied to the fourth spoke 600. One end in the radial direction of the second support 620 is connected to the first spoke body 100 or the first connection member 700, and the other end in the radial direction of the second support 620 is connected to the first support 610. The second support 620 inclines toward the other side in the axial direction when viewed in the circumferential direction, and inclines toward one side of the circumferential direction when viewed in the axial direction.

The fourth joint 630 connects the first support 610 and the second support 620. In other words, the fourth joint 630 connects one end in the radial direction of the first support 610 to the other end in the radial direction of the second support 620. In addition, the fourth joint 630 provides a portion through which the second connection member 800 to be described later is connected to the fourth spoke 600.

Meanwhile, when viewed in the circumferential direction, the first spoke 300 and the second spoke 400 are disposed alternately along the axial direction, the third spoke 500 and the fourth spoke 600 are alternately disposed along the axial direction. In addition, when viewed in the axial direction, the first spoke 300 and the third spoke 500 are alternately disposed along the circumferential direction, the second spoke 400 and the fourth spoke 600 are disposed alternately along the circumferential direction.

In addition, when viewed in the circumferential direction, the first spoke 300 and the second spoke 400 are spaced apart from each other to be symmetric with respect to an axis extending along the radial direction, and the third spoke 500 and the fourth spokes 600 are spaced apart from each other to be symmetric with respect to an axis extending along the radial direction. In addition, when viewed in the axial direction, the first spoke 300 and the third spoke 500 are spaced apart from each other to be symmetric with respect to an axis extending along the radial direction, and the second spoke 400 and the fourth spoke 600 are spaced apart from each other to be symmetric with respect to an axis extending along the radial direction.

The first connection member 700 connects the first spoke 300, the second spoke 400, the third spoke 500, and the fourth spoke 600. In addition, when the plurality of first spokes 300 are provided, the first connection member 700 connects the plurality of first spokes 300 disposed along the radial direction to each other. The same may be applied to the second spoke 400, the third spoke 500, and the fourth spoke 600. The first connection member 700 is connected to one of the both ends in the radial direction of each of the first spoke 300, the second spoke 400, the third spoke 500, and the fourth spoke 600. A plurality of first connection members 700 may be provided. The first connection member 700 may extend in both of the axial direction and the circumferential direction. For example, the first connection member 700 may have a rectangular plate shape, and may have a straight shape or an arc shape when viewed in the axial direction.

Referring to FIG. 4, the second connection members 800 connect the first spoke 300 and the third spoke 500 disposed at one end side in the axial direction, and connect the second spoke 400 and the fourth spoke 600 disposed at the other end side in the axial direction. In other words, the second connection member 800 connects the first joint 330 and the third joint 530 to thereby connect the first spoke 300 and the third spoke 500. In addition, the second connection member 800 connects the second joint 430 and the fourth joint 630 to thereby connect the first spoke 300 and the third spoke 500.

Specifically, the first spoke 300 and the third spoke 500 disposed at the one end side in the axial direction are alternately disposed along the circumferential direction. In addition, the first joint 330 and the third joint 530 are also alternately positioned along the circumferential direction. The second connection member 800 connects the first joint 330 and the third joint 530 closer thereto among the third joints 530 located at both sides in the circumferential direction of the corresponding first joint 330.

Further, the second spokes 400 and the fourth spokes 600 disposed at the other end side in the axial direction are alternately disposed along the circumferential direction. In addition, the second joint 430 and the fourth joint 630 are also alternately positioned along the circumferential direction. The second connection member 800 connects the second joint 430 and the fourth joint 630 closer thereto among the fourth joints 630 located at both sides in the circumferential direction of the corresponding second joint 430.

Figure 5:
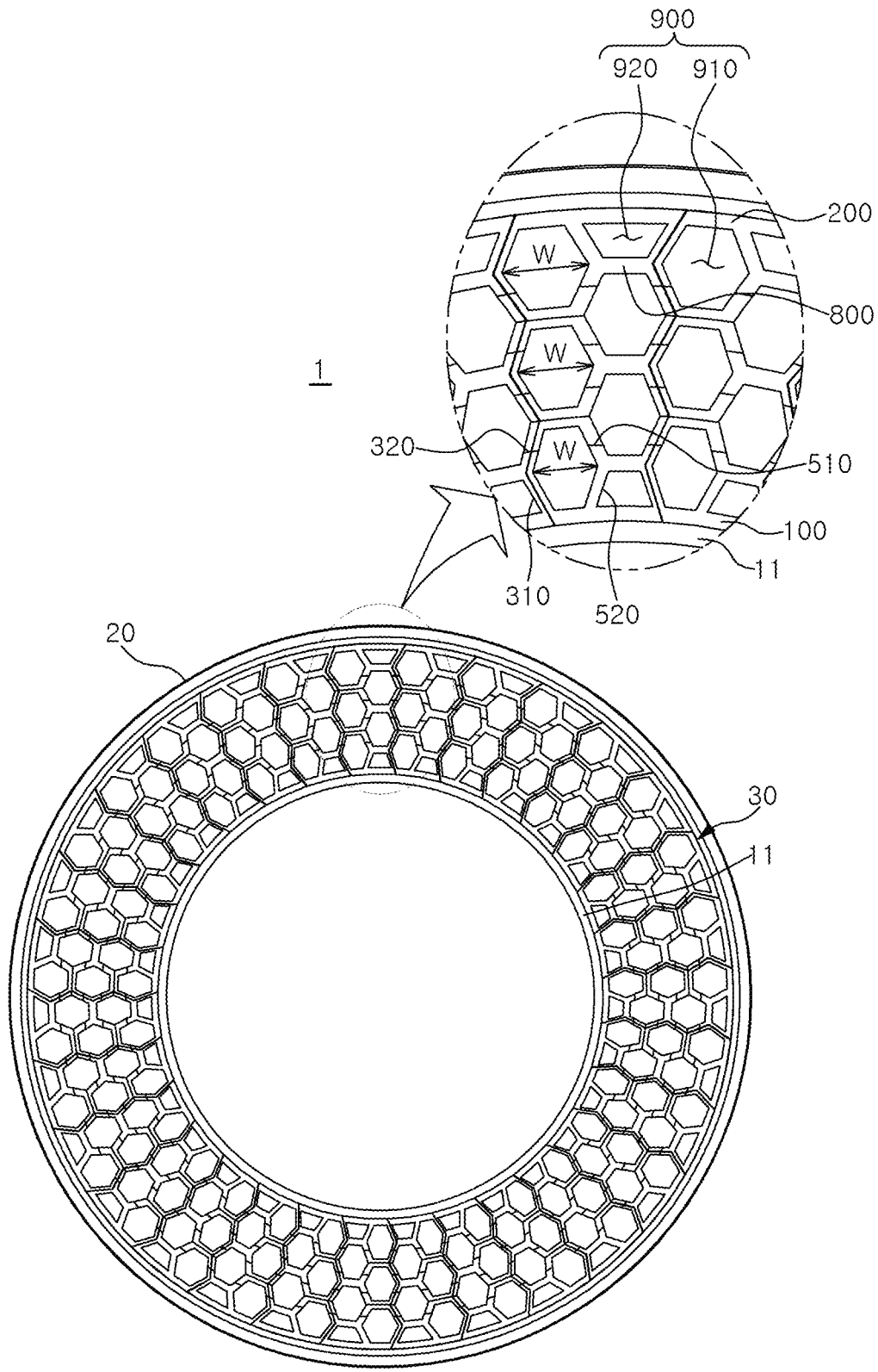
FIG. 5 is a front view of the non-pneumatic tire shown in FIG. 1.

Referring to FIGS. 3 and 5, the holes 900 are defined by the first spoke body 100, the second spoke body 200, the first spoke 300, the second spoke 400, the third spoke 500, the fourth spoke 600, the first connection member 700 and the second connection member 800. The holes 900 include a first hole 910 and a second hole 920.

The first hole 910 may have a hexagonal shape when viewed in the circumferential direction and the axial direction. A plurality of first holes 910 may be provided. In addition, when viewed in the circumferential direction, the first holes 910 may be alternately arranged with the second holes 920 along the axial direction at the end portions in the radial direction. In addition, when viewed in the axial direction, the first holes 910 and the second holes 920 may be alternately arranged along the circumferential direction at the end portions in the radial direction.

The second hole 920 may have a semi-hexagonal shape (i.e., a trapezoidal shape) when viewed in the circumferential direction and the axial direction. A plurality of second holes 920 may be provided. In addition, some of the second holes 920 may be defined at one side in the radial direction by the first spoke body 100. In addition, the rest of the second holes 920 may be defined at the other side in the radial direction by the second spoke body 200.

Referring to FIG. 5, the width W of the hole 900 may be determined depending on a distance away from the center of the non-pneumatic tire 1 when viewed in the circumferential direction. In other words, the farther the hole 900 is from the center of the non-pneumatic tire 1, the larger the width W of the hole 900. For example, the width W of the hole 900 disposed closer to the second spoke body 200 than the first spoke body 100 is larger than the width W of the disposed hole 900 closer to the first spoke body 100 than the second spoke body 200.

Hereinafter, the operation and effect of the non-pneumatic tire 1 having the above-described configuration will be described.

The tread 20 is provided to the outermost side of the non-pneumatic tire 1. The share band 13 is provided inside the tread 20 to surround the outer band 12. In addition, the outer band 12 surrounds the outside of the spoke part 30. Further, the inner side of the spoke part 30 surrounds the inner band 11. The spoke part 30 includes the first spoke body 100 provided at the inner side thereof, and includes the second spoke body 200 provided at the outer side thereof. In addition, the first spoke body 100 and the second spoke body 200 are connected by the first spoke 300, the second spoke 400, the third spoke 500 and the fourth spoke 600. The first spoke 300, the second spoke 400, the third spoke 500, and the fourth spoke 600 may relieve an impact applied to the tire.

The non-pneumatic tire according to the embodiment of the present disclosure has excellent driving performance and load bearing ability. In addition, the non-pneumatic tire is capable of reducing vibration and noise. Further, the non-pneumatic tire can have excellent rigidity.

While the present disclosure has been shown and described with respect to the embodiments, it will be understood by those skilled in the art that various changes and modifications may be made without departing from the scope of the present disclosure as defined in the following claims.

What is claimed is:

1. A non-pneumatic tire comprising:
    a band part including an inner band and an outer band, the outer band being separated from the inner band by a predetermined distance to surround the inner band; and
    a spoke part provided to extend in a circumferential direction of the tire between the inner band and the outer band, the spoke part including one or more holes when viewed in the circumferential direction and one or more holes when viewed in an axial direction of the tire,
    wherein the spoke part includes:
    a first spoke body provided on an outer peripheral surface of the inner band;
    a second spoke body provided on an inner peripheral surface of the outer band;
    a first spoke extending along a radial direction of the tire from the first spoke body to the second spoke body, the first spoke extending in a zigzag shape when viewed in the circumferential direction and the axial direction;
    a second spoke extending along the radial direction from the first spoke body to the second spoke body, the second spoke extending in a zigzag shape when viewed in the circumferential direction and the axial direction;
    a third spoke extending along the radial direction from the first spoke body to the second spoke body, the third spoke extending in a zigzag shape when viewed in the circumferential direction and the axial direction;
    a fourth spoke extending along the radial direction from the first spoke body to the second spoke body, the fourth spoke extending in a zigzag shape when viewed in the circumferential direction and the axial direction; and
    a first connection member extending in both of the axial direction and the circumferential direction to connect the first spoke, the second spoke, the third spoke and the fourth spoke,
    wherein each of the first spoke and the fourth spoke includes a first support and a second support that are connected at a predetermined angle,
    wherein each of the second spoke and the third spoke includes a third support and a fourth support that are connected at a predetermined angle,
    wherein when viewed in the circumferential direction, the first support and the fourth support incline toward one side in the axial direction and the second support and the third support incline toward the other side in the axial direction, and wherein when viewed in the axial direction, the second support and the fourth support incline toward one side in the circumferential direction and the first support and the third support incline toward the other side in the circumferential direction.

2. The non-pneumatic tire of claim 1, wherein the first spoke and the second spoke are alternately disposed along the axial direction, wherein the third spoke and the fourth spoke are alternately disposed along the axial direction, wherein the first spoke and the third spoke are alternately disposed along the circumferential direction, and wherein the second spoke and the fourth spoke are alternately disposed along the circumferential direction.

3. The non-pneumatic tire of claim 1, wherein one end in the radial direction of the first spoke is connected to the first spoke body or the first connection member and the other end in the radial direction of the first spoke is connected to the second spoke body or the first connection member, wherein one end in the radial direction of the second spoke is connected to the first spoke body or the first connection member and the other end in the radial direction of the second spoke is connected to the second spoke body or the first connection member, wherein one end in the radial direction of the third spoke is connected to the first spoke body or the first connection member and the other end in the radial direction of the third spoke is connected to the second spoke body or the first connection member, and wherein one end in the radial direction of the fourth spoke is connected to the first spoke body or the first connection member and the other end in the radial direction of the fourth spoke is connected to the second spoke body or the first connection member.

4. The non-pneumatic tire of claim 1, further comprising: second connection members which connect the first spoke and the third spoke disposed at one end side in the axial direction, and connect the second spoke and the fourth spoke disposed at the other end side in the axial direction, wherein the first spoke further includes a first joint connecting one end in the radial direction of the first support to one end in the radial direction of the second support, the second spoke further includes a second joint connecting one end in the radial direction of the third support to one end in the radial direction of the fourth support, the third spoke further includes a third joint connecting the other end in the radial direction of the third support to the other one end in the radial direction of the fourth support, the fourth spoke further includes a fourth joint connecting the other end in the radial direction of the first support to the other one end in the radial direction of the second support, and the second connection members extend to connect the first joint and the third joint and extend to connect the second joint and the fourth joint.

5. The non-pneumatic tire of claim 2, wherein the first spoke and the second spoke are spaced apart from each other to be symmetric with respect to an axis extending along the radial direction when viewed in the circumferential direction, the third spoke and the fourth spoke are spaced apart from each other to be symmetric with respect to an axis extending along the radial direction when viewed in the circumferential direction, the first spoke and the third spoke are spaced apart from each other along the circumferential direction to be symmetric with respect to an axis extending along the radial direction when viewed in the axial direction, and the second spoke and the fourth spoke are spaced apart from each other along the circumferential direction to be symmetric with respect to an axis extending along the radial direction when viewed in the axial direction.

6. The non-pneumatic tire of claim 1, wherein the first spoke includes a plurality of first spoke pieces that are connected through the first connection member along the radial direction, the second spoke includes a plurality of second spoke pieces that are connected through the first connection member along the radial direction, the third spoke includes a plurality of third spoke pieces that are connected through the first connection member along the radial direction, and the fourth spoke includes a plurality of fourth spoke pieces that are connected through the first connection member along the radial direction.

7. The non-pneumatic tire of claim 1, wherein, when viewed in the circumferential direction and the axial direction, some of the holes each have a hexagonal shape and the remaining holes each have a semi-hexagonal shape.

8. The non-pneumatic tire of claim 7, wherein, when viewed in the circumferential direction, widths of the holes having the hexagonal shape are increased as the holes are disposed farther from the inner band.

* * * * *